United States Patent
Beukema et al.

(10) Patent No.: US 8,401,135 B2
(45) Date of Patent: Mar. 19, 2013

(54) POST-EQUALIZATION AMPLITUDE LATCH-BASED CHANNEL CHARACTERISTIC MEASUREMENT

(75) Inventors: Troy J. Beukema, Yorktown Heights, NY (US); William R. Kelly, Hopewell Junction, NY (US); Michael A. Sorna, Hopewell Junction, NY (US); Daniel W. Storaska, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 12/698,629

(22) Filed: Feb. 2, 2010

(65) Prior Publication Data
US 2011/0188566 A1     Aug. 4, 2011

(51) Int. Cl.
*H04B 1/10* (2006.01)
(52) U.S. Cl. ......... 375/350; 375/346; 455/307; 708/300
(58) Field of Classification Search .................... 375/350
See application file for complete search history.

(56) References Cited

U.S. PATENT DOCUMENTS

| | | | |
|---|---|---|---|
| 5,223,843 A * | 6/1993 | Hutchinson | 342/352 |
| 6,614,314 B2 * | 9/2003 | d'Haene et al. | 331/1 A |
| 7,403,010 B1 * | 7/2008 | Hertz | 324/318 |
| 2003/0189903 A1 * | 10/2003 | Hsu et al. | 370/241 |
| 2005/0047500 A1 * | 3/2005 | Gupta et al. | 375/232 |
| 2005/0135494 A1 * | 6/2005 | Kybett et al. | 375/260 |
| 2007/0009066 A1 * | 1/2007 | Fredriksson | 375/326 |
| 2008/0164917 A1 * | 7/2008 | Floyd et al. | 327/117 |
| 2009/0285272 A1 * | 11/2009 | Stojanovic et al. | 375/219 |

* cited by examiner

*Primary Examiner* — Erin File
(74) *Attorney, Agent, or Firm* — Cantor Colburn LLP; Ian MacKinnon

(57) ABSTRACT

A serial data receiver includes an amplitude path including a first signal conditioner that adds a first offset or subtracts a second offset based on a selection input, a preamp configured to receive a signal from a transmitter and provide an input signal to the amplitude path, an amplitude latch coupled to the amplitude path, a data latch having a data output and a decision feedback equalization (DFE) logic block coupled to the first conditioning element and the data output and configured to generate the selection output based on the data output of the data latch.

12 Claims, 6 Drawing Sheets

POST-EQUALIZATION AMPLITUDE LATCH-BASED CHANNEL CHARACTERISTIC MEASUREMENT

BACKGROUND

The present invention relates to communications and, more specifically, to measuring channel characteristics in a high-speed serial channel.

A SerDes or serializer/deserializer is an integrated circuit (IC or chip) transceiver that converts parallel data to serial data and vice-versa. The transmitter section (Tx) is a parallel-to-serial converter, and the receiver section (Rx) is a serial-to-serial converter. Multiple SerDes interfaces are often housed in a single package. SerDes chips facilitate the transmission of parallel data between two points over serial streams, reducing the number of data paths and thus the number of connecting PINs or wires required.

The Tx block typically has a parallel clock input, a set of data input lines, and input data latches. It may use an external Phase-locked loop (PLL) to multiply the incoming parallel clock up to the serial frequency. The simplest form of the Tx block has a single shift register that receives the parallel data once per parallel clock, and shifts it out at the higher serial clock rate.

The Rx block typically has a receive clock output, a set of data output lines, and output data latches. The receive clock may have been recovered from the data by the serial clock recovery technique. The Rx block then divides the incoming clock down to the parallel rate. Implementations typically have two registers connected as a double buffer. One register is used to clock in the serial stream, and the other is used to hold the data for the slower, parallel side.

The ability to determine the signal integrity of data acquired over a high speed SerDes (HSS), such as eye quality and insertion loss, after having been equalized by the receiver has been an illusive task in the HSS design realm. The information contained in such data allows for the characterization of the receive side amplifying and equalization circuitry. Past techniques to attain such information have involved the use of a combination of lab measurements and simulation since direct measurement of an on-chip circuit node was impossible.

SUMMARY

According to one embodiment of the present invention, a serial data receiver is provided. The receiver of this embodiment may include an amplitude path including a first amplifier sub-path and a second amplifier subpath and a preamp configured to receive a signal from a transmitter and provide an input signal to the amplitude path. The receiver of this embodiment may also include an amplitude speculation multiplexer coupled to the first amplifier sub-path and a second amplifier subpath and configured to select the first amplifier sub-path on receipt of a first selection signal and the second amplifier sub-path on receipt of a second selection signal, an amplitude latch coupled to an output of the amplitude speculation multiplexer and a data latch having a data output. The receiver may also include a decision feedback equalization (DFE) logic block coupled to the amplitude speculation multiplexer and the data output and configured to generate either the first selection signal or the second selection signal based on the data output of the data latch. In addition, in this embodiment, the receiver may include a clock recovery circuit operable to generate a recovered clock from a serial data signal and coupled to the amplitude latch and the data latch and a phase rotator operable to shift a phase of the recovered clock to form a phase-rotated recovered clock.

In another embodiment of the present invention, a decision feedback equalization (DFE) circuit for use in high-speed serial-deserializer is disclosed. The circuit of this embodiment may include an amplitude path including a first amplifier sub-path and a second amplifier subpath, an amplitude speculation multiplexer coupled to the first amplifier sub-path and a second amplifier subpath and configured to select the first amplifier sub-path on receipt of a first selection signal and the second amplifier sub-path on receipt of a second selection signal, and an amplitude latch coupled to an output of the amplitude speculation multiplexer. The DFE circuit of this embodiment may also include a data latch having a data output and a decision feedback logic (DFE) logic block coupled to the amplitude speculation multiplexer and the data output and configured to generate either the first selection signal or the second selection signal based on the data output of the data latch.

In yet another embodiment of the present invention, a serial data receiver is provided. The receiver of this embodiment may include an amplitude path including a first signal conditioner, the first conditioner adding a first offset or subtracting a second offset based on a selection input and a preamp configured to receive a signal from a transmitter and provide an input signal to the amplitude path. The receiver of this embodiment may also include an amplitude latch coupled to the amplitude path, a data latch having a data output, a decision feedback equalization (DFE) logic block coupled to the first conditioning element and the data output and configured to generate the selection output based on the data output of the data latch, a clock recovery circuit operable to generate a recovered clock from a serial data signal and coupled to the amplitude latch and the data latch and a phase rotator operable to shift a phase of the recovered clock to form a phase-rotated recovered clock.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As discussed above, in-situ acquisition of eye and insertion loss information after equalization within the receiver has previously been impossible. One embodiment of the present invention may overcome this and other limitations.

In more detail, the present invention provides a method to utilize the existing HSS circuitry to analyze the incoming data stream and determine the channel characteristics. In one embodiment, the analysis may be conducted even after the application of Decision Feedback Equalization (DFE) in the receiver.

The above may be accomplished, generally, by placing the HSS core into a channel measurement mode whereby it transmits a test pattern which is a step function (128 0's/128 1's). The incoming data signal is sampled and, by using the ability to adjust the offset of the amplitude sample latch, determining the magnitude of the signal at a given point in time.

The points in time are acquired by matching the length of the pattern to the frequency of the querying clock of the amplitude sample latch. Sub unit-interval (bit period) resolution can be acquired by cycling the phase rotator throughout its range while stepping the phase rotator beyond a unit interval allows for the acquisition of subsequent bits. Based on the data path history, and knowing that triggering is based on a known pattern, DFE corrections from the data path can be applied to the amplitude path. Finally, the captured waveform data can be post-processed by some smoothing algorithms, differentiated to produce the impulse response and ultimately transformed to the frequency domain via the application of standard FFT techniques. The resulting frequency response yields a significant amount of information about the channel such as the loss characteristics, discontinuities in the channel and can provide a means to judge the amount of receiver equalization currently in use for the present communication.

In a second function of the amplitude sample latch capture method described above, a periodic pseudo-random pattern can be analyzed to produce the internal eye diagram at the input to the receiver's serial data sampling latch. This technique involves taking many samples of the data as described above and stacking the data in unit intervals. The result is a picture of the data eye that can be used to determine amount of system equalization in a qualitative manner.

Figure 1:
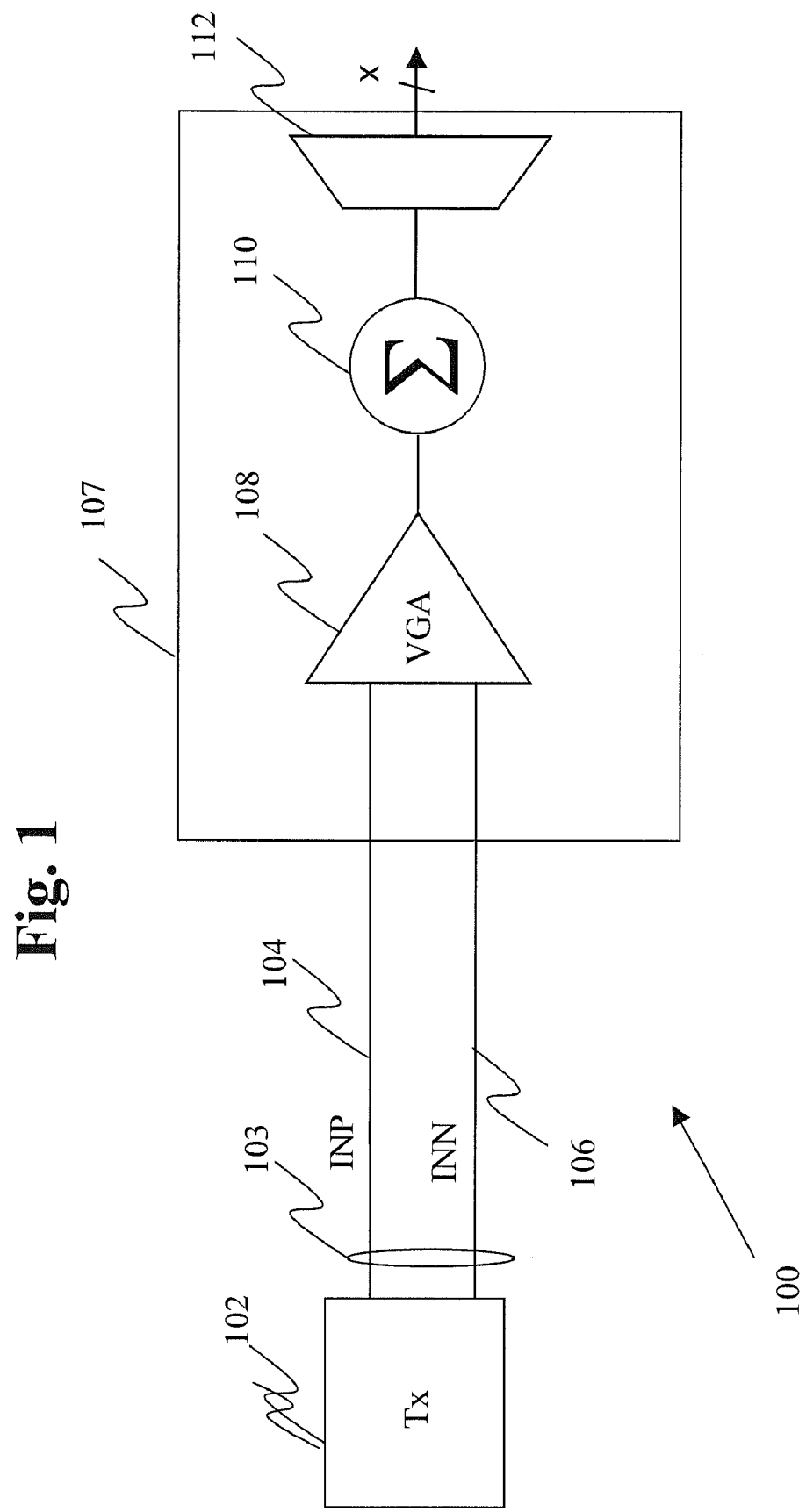
FIG. 1 shows a high-level block diagram of a high-speed serial-deserializer (HSS)

FIG. 1 shows an example of HSS 100 according to one embodiment of the present invention. The HSS 100 shown in FIG. 1 includes a transmit (Tx) block 102. The Tx block 102 receives parallel data from a source and converts it to serial data for transmission over transmission medium 103. The simplest form of the Tx block 102 has a single shift register that receives the parallel data once per parallel clock, and shifts it out at the higher serial clock rate.

In one embodiment, the transmission medium 103 includes a differential pair of conductors. For example, the transmission medium 103 may include a positive input (IP) 104 and a negative input (IN) 106 where IN 106 is the opposite of IP 104.

The transmission medium 103 provides communication between the Tx block 102 and a receive (Rx) block 107. The Rx block 107 receives serial data from the Tx block and produces an x bit wide serial output from a de-serializer 112.

The Rx block 107 includes an input amplifier 108 (preamplifier) implemented as a variable gain amplifier (VGA) in FIG. 1. Of course, input amplifier 108 could be implemented as another type of amplifier. The input amplifier 108, in one embodiment, is coupled to the serial signal received over transmission medium 103. In particular, the input amplifier 108 is coupled to the differential inputs, IP 104 and IN 106. The input amplifier 108 may form a single received input has an output to connector 109. As shown, the output of input amplifier 108 is single line. It shall be understood that, in some embodiments, some or all signal paths shown in FIG. 1 (and other Figs. herein) may be differential lines. That is, in some cases, a single line may be implemented as two differential lines.

Connector 109 (carrying the output of the input amplifier 108) is coupled to a DFE circuit 110. In general, the DFE circuit 110 is a nonlinear equalizer that uses previous decisions to eliminate the bias on pulses that are currently being demodulated. In other words, the distortion on a current pulse that was caused by previous pulses is subtracted.

In the prior art, it was not possible to accurately measure channel characteristics while the DFE circuit 110 was operational. One embodiment of the present invention is directed to a modified DFE circuit 110 that provides, while running, signals from which channel characteristics may be measured. The output of the DFE circuit 110 is provided to the de-serializer 112 to produce the de-serialized output.

Figure 2:
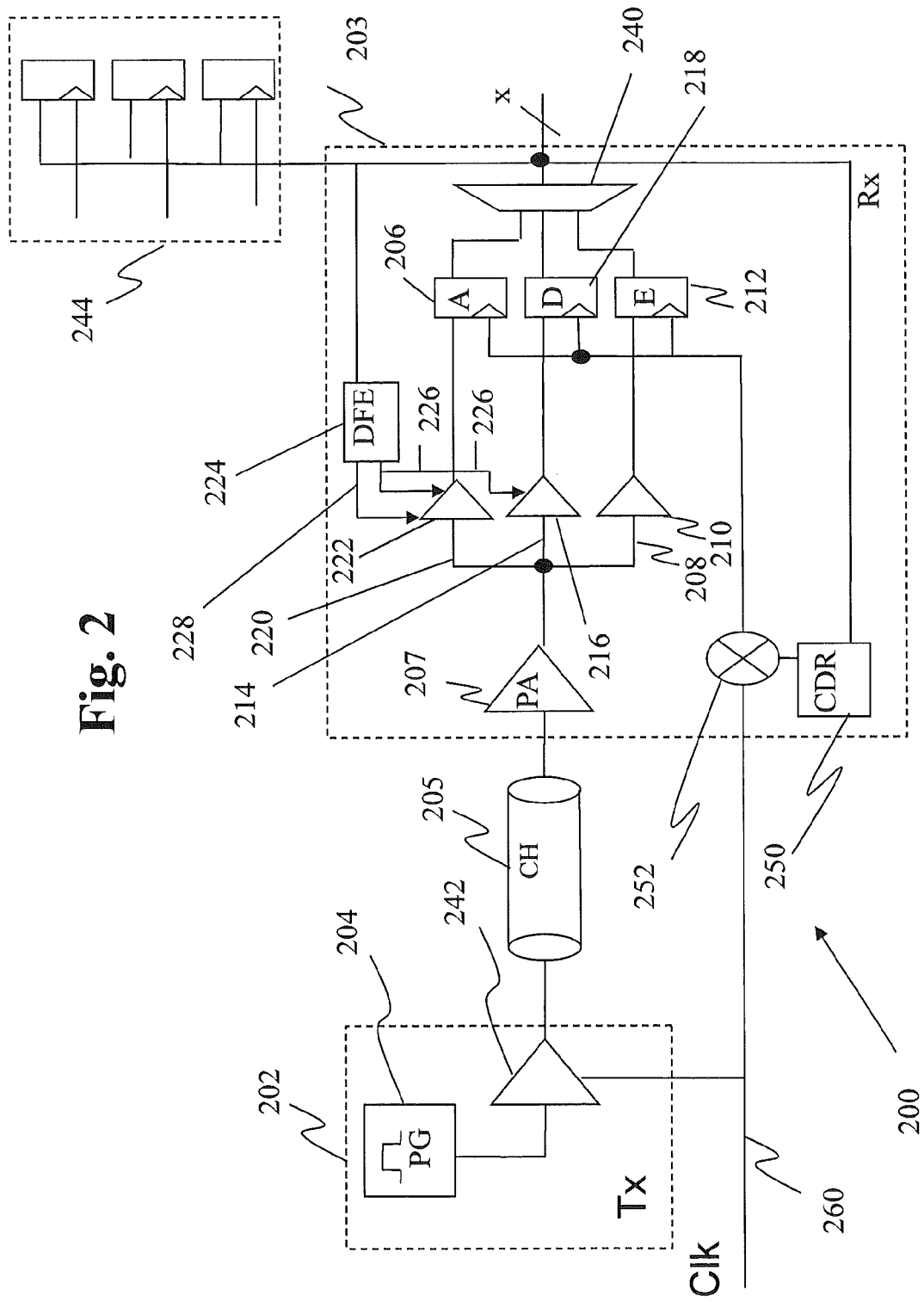
FIG. 2 shows a more detailed diagram of an HSS according to one embodiment of the present invention.

FIG. 2 shows a more detailed depiction of the HSS 200 according to one embodiment. The HSS 200 of this embodiment includes a transmit (Tx) block 202 and a receive (Rx) block 203. The Tx block 202 is coupled to the Rx block 203 by a channel 205. The channel 205 may be, for example, capable of transmitting high-speed serial data. The channel 205 may, in one embodiment, transmit binary data as a differential pair.

The Tx block 202 includes a pattern generator 204. In one embodiment, the pattern generator 204 is programmed to generate a pattern that represents a step function. The step function is used because it is readily analyzable and is easy to generate. In one embodiment, the step function may be formed by an equal number of consecutive 0's and 1's (for example 128 0's followed by 128 1's) and repeats. The Tx block 202 may also include a driver 242 that drives a signal over the channel 205.

In one embodiment, the step function produced by the pattern generator 204 is matched to the length of a sampling period of an amplitude latch 206 in the Rx block 203. In this way, the data will be cyclo-stationary. That is, every time the amplitude latch 206 is sampled, the data will be in the same place regardless of the fact that the sampling is asynchronous with respect to the data transmission rate. As used herein, asynchronous refers to the fact that each sampling point is on a 128 interval of the incoming data, but not necessarily on the same 128-bit interval. Once the data within the amplitude latch 206 is cyclo-stationary, each bit represents a sampled point in time of the incoming waveform and can be analyzed to determine the actual amplitude of the waveform at that point in time. This may be accomplished by adjusting the offset of a signal provided to the amplitude latch 206 such that the bit under analysis transitions from a '0' to a '1'. The value of the amplitude offset latch 206 threshold is recorded and associated with that position in the waveform.

The Rx block 203 receives data (or other information) and provides it to an input amplifier 207. The Rx block 203 may include multiple paths from the output of the input amplifier 207 through which the received information may pass. In one embodiment, each path may contain one or more signal conditioning elements. In one embodiment, the signal conditioning elements may include a summer. In one embodiment, the signal conditioning element may include a summer and other circuitry. As shown, each path includes one signal conditioner. Of course, any of the paths could include more or less signal conditioners.

In FIG. 2 an edge detection path is indicated by reference numeral 208 includes signal conditioner 210. The edge detection path 208 is coupled to an edge latch 224 coupled to an output of signal conditioner 212. The edge latch 212 may used to detect the clock from the incoming signal or otherwise allow the Rx block 203 to operate in an asynchronous mode.

A data path is indicated by reference numeral 214 in FIG. 2. The data path 214 extends between an output of the input amplifier 207 and a data latch 218. The data latch 218 provides data to the de-serializer 240. As shown, the data path 214 includes signal conditioner 216.

An amplitude path is indicated by reference numeral 220 in FIG. 2. The amplitude path 220 extends between an output of the input amplifier 207 and the amplitude latch 206. As shown, the amplitude path 220 includes signal conditioner 222.

The Rx block 203 may also include a DFE logic block 224. Collectively, the DFE logic block 224 and paths 208, 214 and 220 may form the DFE circuit 110 (FIG. 1). Of course, the DFE circuit 110 could include more elements than shown depending on the implementation. For example, each path may include more signal conditioners.

In one embodiment the DFE logic block 224 may vary the operation of one or both of the amplitude path 220 and the data path 214. In particular, the DFE logic block 228 may cause the signal conditioners in the amplitude path 222 and the data path 214 to vary the signals provided thereto in order to remove cumulative effects of prior bits. This may be accomplished by providing additive or subtractive values to the signal conditioners 222 and 216 as indicated by connection 226.

The HSS 200 may also include an output copy section 244. This output copy section 244, while not required, may prove helpful in analyzing the outputs of the amplitude latch 206, data latch 218 and edge latch 212. The output copy section may be include latches coupled to the outputs of the amplitude latch 206, the data latch 218 and edge latch 212.

Prior to normal operation (functional mode), the HSS 200 may perform an initialization that calibrates a value for an amplitude offset for the amplitude path 220. This amplitude offset sets a level above which is "1" and below which is a "0." In FIG. 2, this input is shown by input 228 and may be used during normal operation to null any DC mismatch within the amplitude path 220 during transmission of data. In an analysis mode (described below) this offset is varied as part of determining channel characteristics.

In the example shown, a reference clock signal 260 is provided to both the Tx block 202 and the Rx block 203. In particular, the clock signal 260 is provided to the phase rotator 252 of the Rx block 203 and may be utilized in clocking the driver 242.

Figure 3:
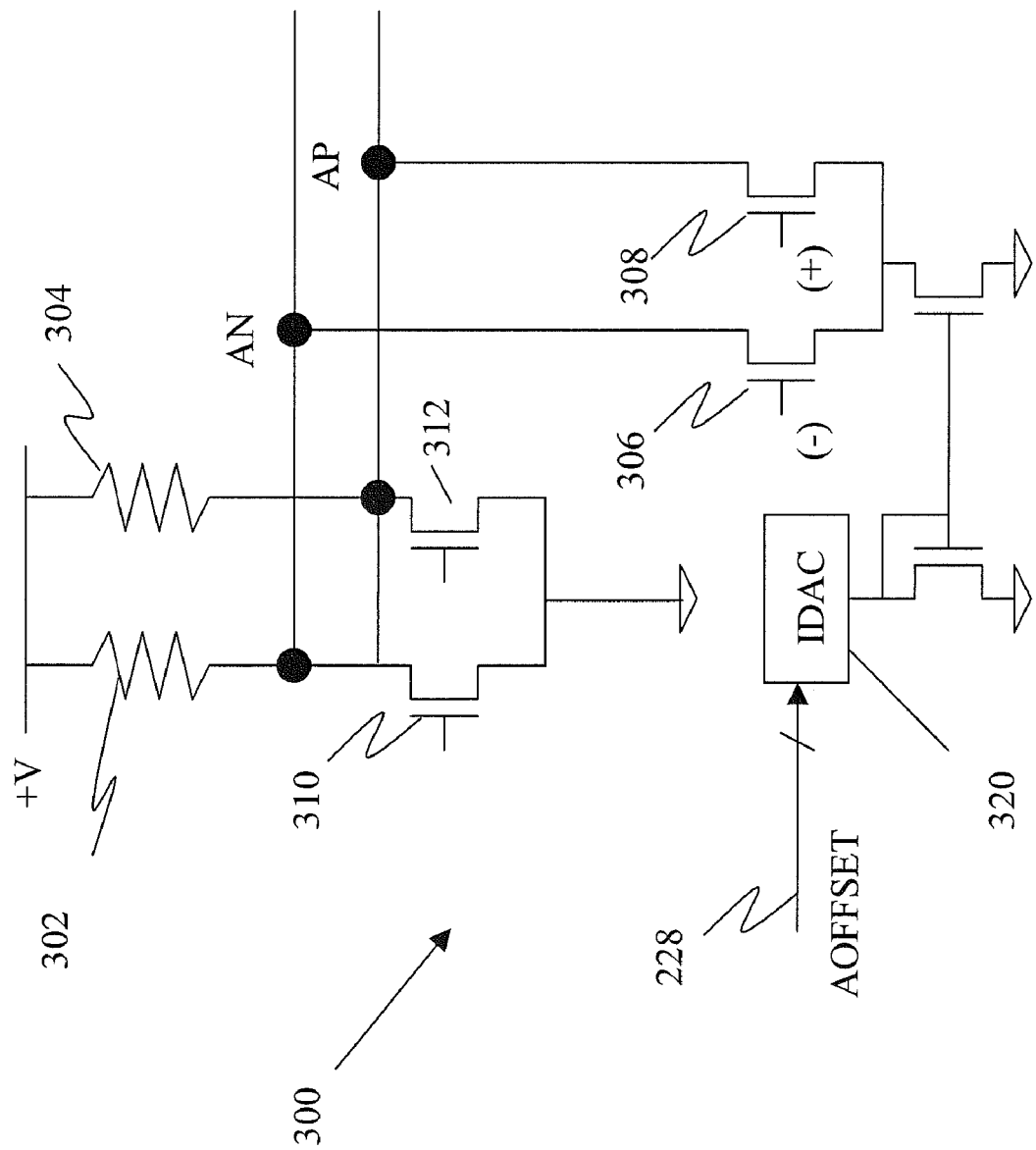
FIG. 3 shows an example of an amplitude offset adjustment circuit.

FIG. 3 shows an example of an offset adjustment circuit 300 that may form part of the signal conditioner 222 in the amplitude path 220 (FIG. 2). This circuit nulls any DC mismatch within the amplitude path during transmission of data. This may be accomplished, in one embodiment, by pulling down one side or the other of the differential output (shown as AP and AN). In particular, either AP or AN may be pulled down through termination resistors 302 and 304 via nfets 306 and 308. The gates of nfets 306 and 308 are coupled, respectively, to a polarity control (not shown) that selects either AN (via nfet 306) or AP (via nfet 308) depending on the context. Switches 310 and 312 are coupled to AN and AP, respectively, and select the value (either binary one or zero) on AN and AP.

These gates of switches 310 and 312 may be, respectively, coupled to the differential input received from the VGA 207 (FIG. 2) or a modified version thereof.

The strength of the offset adjustment is controlled by the amount of current generated by an IDAC circuit 320. In one embodiment, the IDAC circuit 320 may include a 7-bit control. Thus, a total of +/− 128 settings may be realized in one embodiment. The offset setting may be determined during initialization and then held during functional mode. However, during the channel measurement mode, this held value is overridden and the offset is controlled by the DFE logic 224 (via line 228) which searches for the offset setting which results in the current bit of interest within the amplitude latch 206 (FIG. 2) switching from a "0" to a "1". The searching may be performed based on a searching algorithm.

Figure 4:
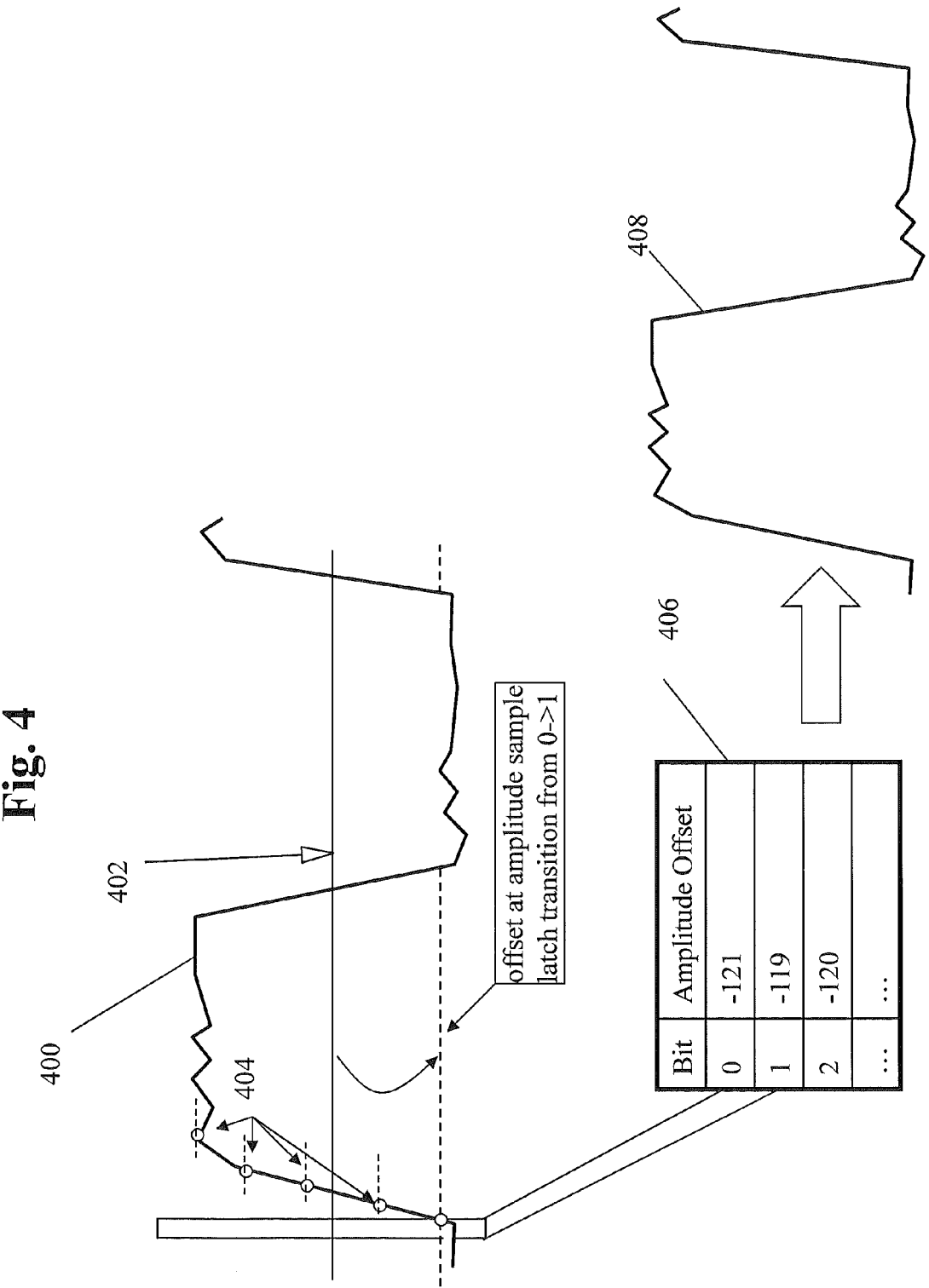
FIG. 4 shows an example of a process where application of a searching algorithm to each bit within the amplitude latch results in the entire incoming analog waveform's information being converted to a digital representation.

Reference is now may to FIG. 4 in which an example of a process where application of the searching algorithm to each bit within the amplitude latch 206 results in the entire incoming analog waveform's 400 information being converted to a digital representation. The incoming wave 400 is periodically sampled. The sample points (bits) 404 are then compared to amplifier offset settings 402 which cause the value of the bit to change from a "0" to a "1." For each bit, the amplifier offset setting 402 may be stored in, for example, an array 406. This information can be plotted in time to form a recreated analog waveform 408.

Referring again to FIG. 2, the ability to obtain sub-unit interval (sub-bit time) information is achieved by moving the sampling point within the bit-time. During functional mode, the sample position of the data bit in time is controlled by a clock-data recovery block (CDR) 250. The CDR 250 is coupled to the edge latch 212 and the data latch 218. In operation, the CDR analyzes information received from the edge latch 212 and data latch 218 to determine the optimal sampling point within the data eye. The actual clock phase sent to the edge latch 212 and data latch 218 (as well as amplitude latch 206) is generated by the phase rotator circuit (PR) 252. During channel measurement mode, the CDR 250 is overridden, and the PR 252 is stepped by an external algorithm via the phase rotator adjustment controls.

Figure 5:
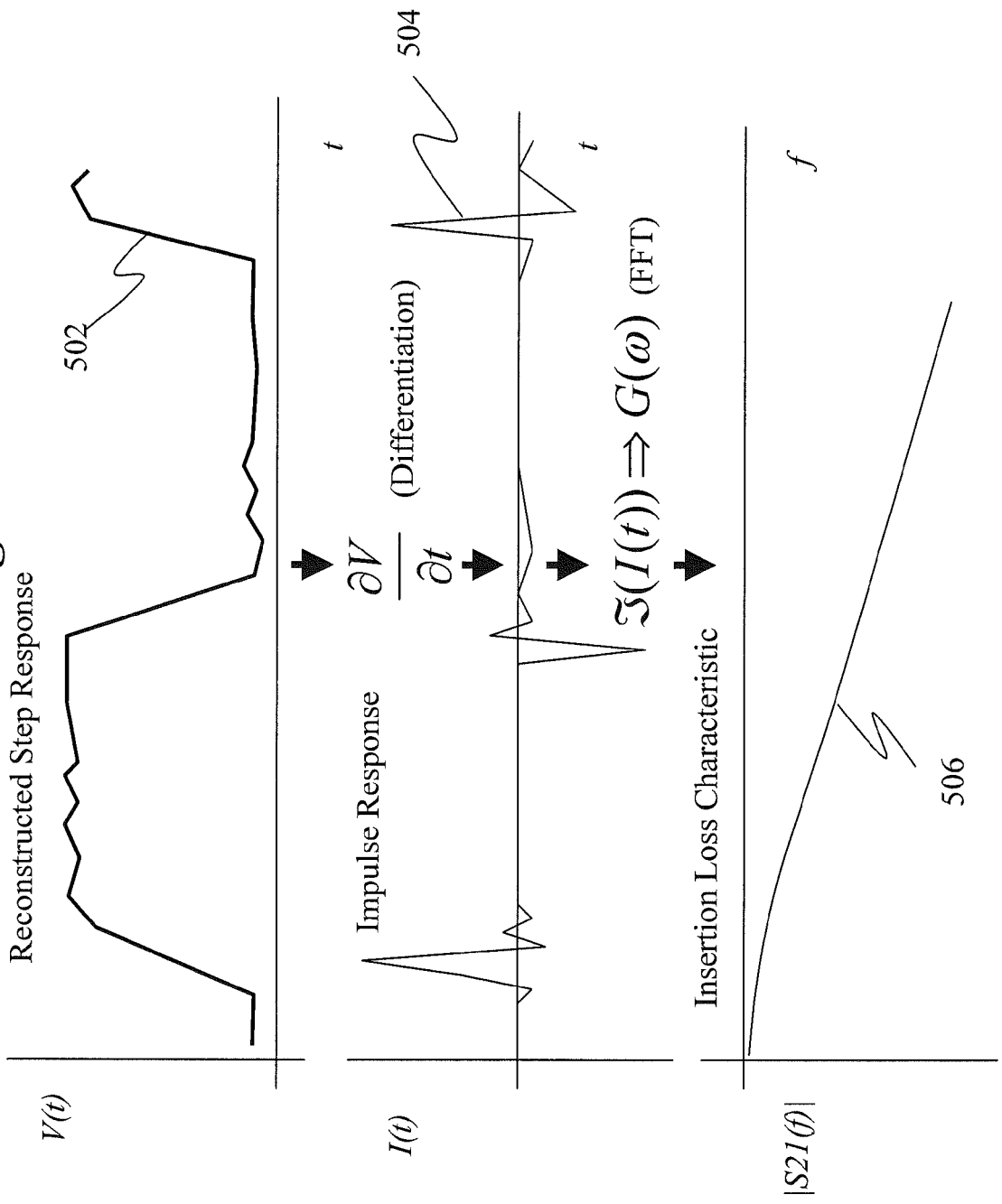
FIG. 5 shows examples of post-processing that may be performed on a digital reproduction of the incoming analog waveform.

FIG. 5 shows the procedure for generating the frequency response of the channel. The reconstructed waveform 502, which represents a step response through the system, is differentiated to produce the impulse response 504. The impulse response is then transformed into the frequency domain using a discrete fourier transform algorithm and normalized to produce the insertion loss 506 of the channel. The loss of the channel in-situ can thus be obtained using existing circuitry within the HSS core. Acquiring finer data samples in time by stepping the phase rotator allows for greater frequency content when transforming to the frequency domain. Also, acquiring more time data by increasing the pattern length improves the frequency resolution when transforming to the frequency domain.

This technique can be modified slightly to produce the eye diagram that contains useful qualitative diagnostic information and is a preliminary step in judging signal integrity. The eye diagram generation can be accomplished by changing the pattern from a step function to a pseudo-random pattern having a period equivalent to the step function. Stated differently, the DFE logic has a sample period. The pseudo-random pattern should have the same period. Again, as long as the pattern is repeating (hence 'pseudo'-random) each individual data bit can be analyzed within the amplitude latch. The randomness of the pattern ensures all possible bit sequences within the pattern to produce an eye diagram which is most affected by inter-symbol interference. Once stored, the data is time-sliced on a bit by bit bases by modulus division of the data by the number of samples per bit. When each time-sliced is overlaid, the resulting eye diagram can be observed.

In the above description, it was assumed that any analysis was performed without DFE or at least the effects thereof had been ignored. It has been discovered, however, that it may be desirable in some instances to analyze channel characteristics after DFE.

Figure 6:
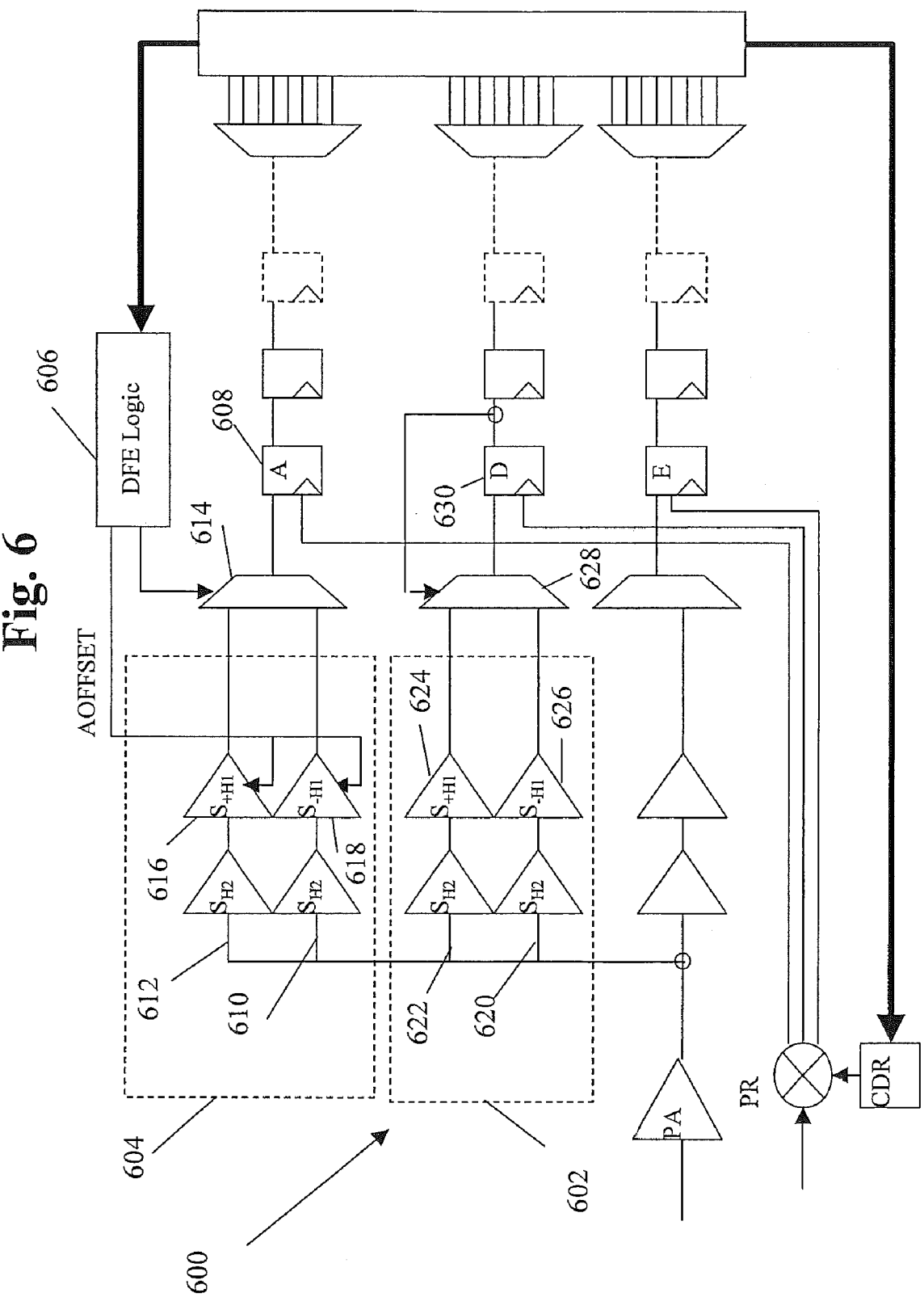
FIG. 6 shows one embodiment of a receiver according to the present invention.

FIG. 6 shows an example of an Rx block 500 according to an embodiment of the present invention that includes the ability to analyze an incoming data eye post-DFE equalization.

In this embodiment, the data path 602 and the amplitude path 604 each have two paths. The purpose of the two paths is to ensure that the correct amplitude is sampled after DFE. As discussed above, DFE logic 606 may cause the amplitude of a signal to be varied based on the value of the preceding data bit. Based on the value of the prior bit, the DFE either adds or subtracts a certain amount from the current bit. For the amplitude latch 608, however, whether the previous bit was a one or zero is not known in time to apply to the correction to the current bit. Accordingly, both an addition and subtraction value may need to be created for both the data path 602 and the amplitude path 604.

In FIG. 6, the amplitude path 604 includes sub-paths 610 and 612. The output of sub-path 612 is has a value added (at adder 616) to it on the assumption that the previous bit was a 1 and sub-path 610 has a value subtracted from it (at adder 618) on the assumption that the previous bit was a zero. Both sub-paths 612 and 610 are coupled to an amplitude selector multiplexer 614.

Similarly, the data path 602 includes sub-paths 620 and 622. The output of sub-path 622 is has a value added to it (at adder 624) on the assumption that the previous bit was a 1 and sub-path 620 has a value subtracted (at adder 626) from it on the assumption that the previous bit was a zero.

The values added and subtracted may be controlled by the DFE logic 606. In addition, the amount of amplitude offset provided to adders 616 and 618 may be determined by the DFE logic 606. The DFE logic 606 may be implemented in hardware, software or a combination thereof.

The problem of using unqualified amplitude latch 608 information directly is that the data may be invalid. This is due to the fact that the data latch 630 utilizes its previous bit to control a speculation multiplexer 628 (coupled to and controlled by the output of the data latch 630) in order to obtain the correct data from either the sub-paths 620 or 622.

The amplitude latch 608, however, cannot employ this technique as the AOFFSET bits have been used to measure (and thus modify) the previous data. In order to correctly place the speculation multiplexer 614 for the amplitude latch 608 into the correct position, information from the data latch 630 is fed back to the DFE logic 606 to determine which path (610 or 612) should be chosen. While the DFE logic 606 is shown as controlling the amplitude speculation multiplexer 614, it shall be understood that this control is based on an output of the data latch 630.

It should be understood, however, that one or both of the data path 602 or amplitude path 604 may not include sub-paths. For example, the amplitude path 604 may include a signal conditioner that either adds or subtracts a value based on an input from the DFE logic. In such an embodiment, the amplitude speculation multiplexer 614 may be omitted.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A serial data receiver, comprising:
an amplitude path including a first amplifier sub-path and a second amplifier subpath;
a preamp configured to receive a signal from a transmitter and provide an input signal to the amplitude path;
an amplitude speculation multiplexer coupled to the first amplifier sub-path and a second amplifier sub-path and configured to select the first amplifier sub-path on receipt of a first selection signal and the second amplifier sub-path on receipt of a second selection signal;
an amplitude latch coupled to an output of the amplitude speculation multiplexer;
a data latch having a data output;
a decision feedback equalization (DFE) logic block coupled to the amplitude speculation multiplexer and the data output and configured to generate either the first selection signal or the second selection signal based on the data output of the data latch;
a clock recovery circuit operable to generate a recovered clock from a serial data signal and coupled to the amplitude latch and the data latch; and
a phase rotator operable to shift a phase of the recovered clock to form a phase-rotated recovered clock;
wherein the first sub-path includes a first summer and the second sub-path includes a second summer and both first and second summers are coupled to the DFE logic block; and
wherein the first summer adds a first amount to the signal based on an assumption that an immediately preceding bit was a logical one and the second summer subtracts a second amount based on an assumption that the immediately preceding bit was a logical zero.

2. The receiver of claim 1, wherein the clock recovery circuit is operable to output an edge clock timed according to an edge of the serial data signal, the serial data receiver further comprising an edge sampling latch, the edge sampling latch being operable to sample the serial data signal with the edge clock to produce edge samples, the edge samples being fed back to the clock recovery circuit for use in recovering the clock.

3. The receiver of claim 1, wherein, when a cyclo-stationary signal is inputted to the pre-amp, the receiver is operable to obtain a digital representation of a time-varying amplitude waveform of the cyclo-stationary signal.

4. The receiver of claim 1, wherein the amplitude path includes a differential amplifier and an amplitude offset is controllable by numerically varying an amount of current supplied to the legs of the differential amplifier.

5. The receiver of claim 4, wherein the amplitude offset adjusts a threshold at an input to the amplifier.

6. The receiver of claim 1, further comprising:
a data path coupled to an output of the pre-amp and having a first data sub-path and a second data sub-path.

7. The receiver of claim 6, further comprising a data speculation multiplexer coupled to the first data sub-path and the second data sub-path and to the data latch and configured to select either the first data sub-path and a second data subpath based on an output of the data latch.

8. A decision feedback equalization circuit for use in high-speed serial-deserializer, the circuit comprising:
an amplitude path including a first amplifier sub-path and a second amplifier subpath;
an amplitude speculation multiplexer coupled to the first amplifier sub-path and a second amplifier sub-path and configured to select the first amplifier sub-path on receipt of a first selection signal and the second amplifier sub-path on receipt of a second selection signal;
an amplitude latch coupled to an output of the amplitude speculation multiplexer;
a data latch having a data output; and
a decision feedback logic (DFE) logic block coupled to the amplitude speculation multiplexer and the data output and configured to generate either the first selection signal or the second selection signal based on the data output of the data latch;
wherein the first sub-path includes a first summer and the second sub-path includes a second summer and both first and second summers are coupled to the DFE logic block; and
wherein the first summer adds a first amount to the signal based on an assumption that an immediately preceding bit was a logical one and the second summer subtracts a second amount based on an assumption that the immediately preceding bit was a logical zero.

9. The circuit of claim 8, wherein, when a cyclo-stationary signal is inputted to the circuit, the circuit is operable to obtain a digital representation of a time-varying amplitude waveform of the cyclo-stationary signal.

10. The circuit of claim 8, wherein the amplitude path includes a differential amplifier and an amplitude offset is controllable by numerically varying an amount of current supplied to the legs of the differential amplifier.

11. The circuit of claim 10, wherein the amplitude offset adjusts a threshold at an input to the amplifier.

12. A serial data receiver, comprising:
an amplitude path including a first signal conditioner, the first conditioner adding a first offset or subtracting a second offset based on a selection input;
a preamp configured to receive a signal from a transmitter and provide an input signal to the amplitude path;
an amplitude latch coupled to the amplitude path;
a data latch having a data output;
a decision feedback equalization (DFE) logic block coupled to the first conditioning element and the data output and configured to generate the selection output based on the data output of the data latch;
a clock recovery circuit operable to generate a recovered clock from a serial data signal and coupled to the amplitude latch and the data latch; and
a phase rotator operable to shift a phase of the recovered clock to form a phase-rotated recovered clock;
wherein the first signal conditioner includes a first summer that adds a first amount to the signal based on an assumption that an immediately preceding bit was a logical one subtracts a second amount based on an assumption that the immediately preceding bit was a logical zero.

* * * * *